March 31, 1970  A. LAUDEL, JR  3,504,187
ELECTRIC GENERATOR AND SPEED CONTROL SYSTEM THEREFOR
Original Filed Dec. 8, 1965  2 Sheets-Sheet 1
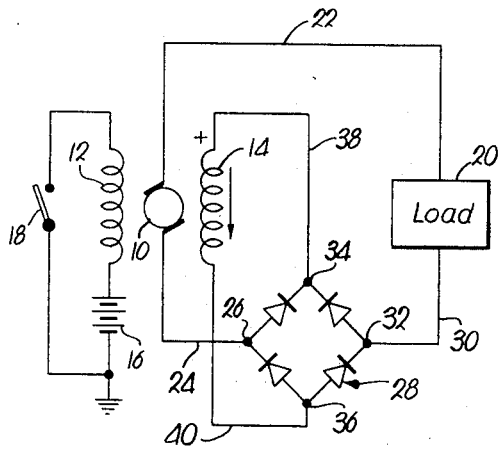
*Fig.1.*
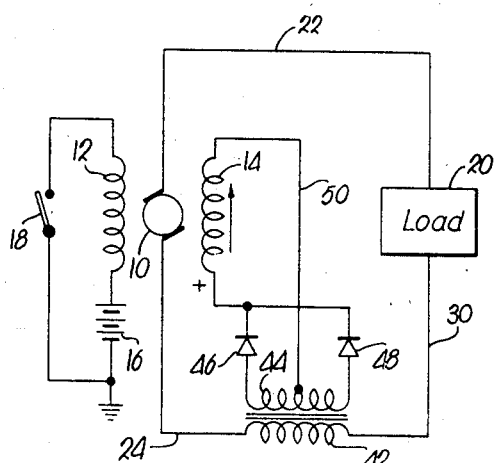
*Fig.2.*
*Fig.3.*
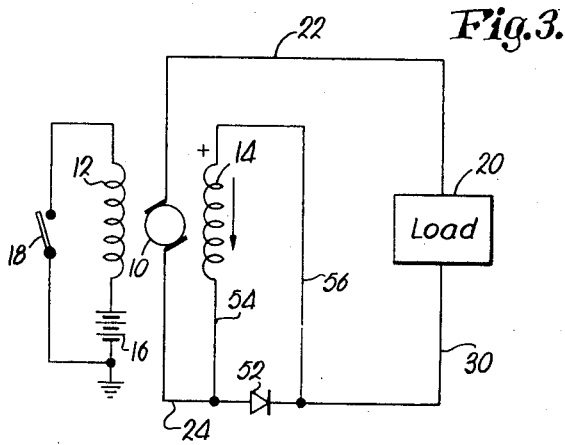
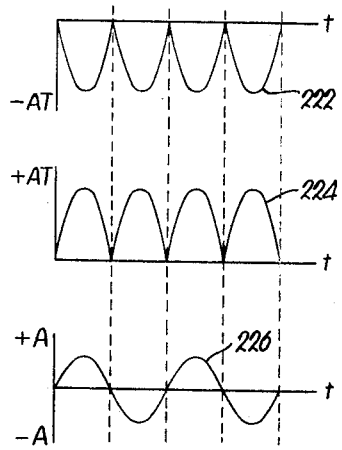
*Fig.4.*
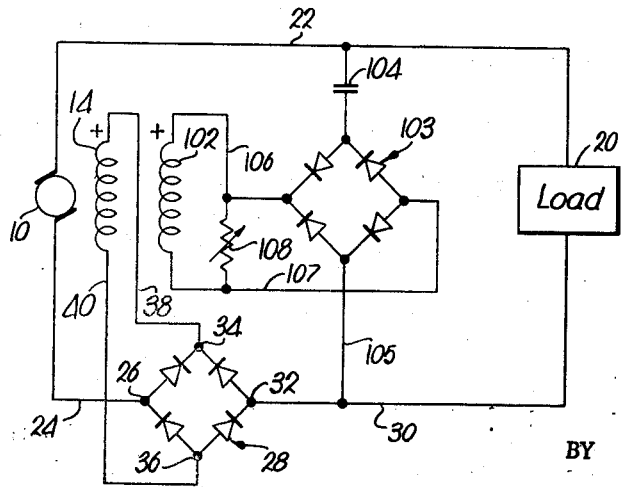
*Fig.6.*
INVENTOR
Arthur Laudel Jr.
BY Schmidt, Johnson, Hovey,
Williams & Bradley
ATTORNEYS.

March 31, 1970     A. LAUDEL, JR     3,504,187

ELECTRIC GENERATOR AND SPEED CONTROL SYSTEM THEREFOR

Original Filed Dec. 8, 1965     2 Sheets-Sheet 2

INVENTOR
Arthur Laudel Jr.

BY *Schmidt, Johnson, Hovey,
Williams & Bradley*
ATTORNEYS.

United States Patent Office 3,504,187
Patented Mar. 31, 1970

3,504,187
ELECTRIC GENERATOR AND SPEED CONTROL SYSTEM THEREFOR
Arthur Laudel, Jr., Leawood, Kans., assignor, by mesne assignments, to Alternac, Prairie Village, Kans., a partnership
Original application Dec. 8, 1965, Ser. No. 512,502, now Patent No. 3,435,325, dated Mar. 25, 1969. Divided and this application Nov. 1, 1968, Ser. No. 772,657
Int. Cl. F02n *11/06*
U.S. Cl. 290—40                                      2 Claims

ABSTRACT OF THE DISCLOSURE

The armature of an alternator is driven by the engine of a motor vehicle which, when the vehicle is stationary, is normally at an idling speed. Control circuitry responsive to the current demands of an external load is provided for actuating the throttle of the engine to increase the throttle setting in accordance with such demands, thereby increasing the speed of the armature so that the alternator will be capable of handling the load.

CROSS REFERENCES

Figure 5:
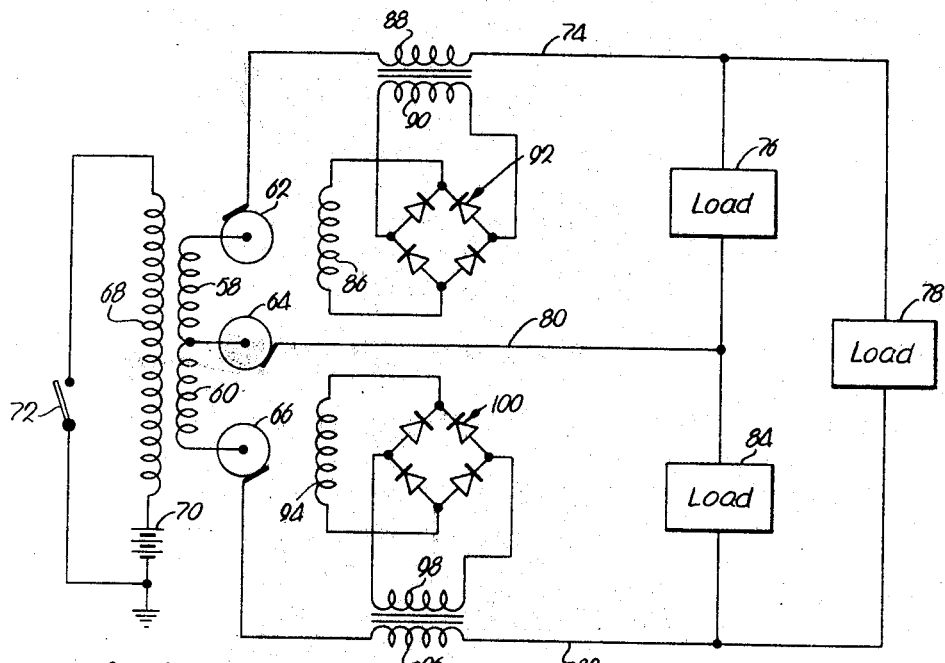

This application is a division of my co-pending application Ser. No. 512,502, filed Dec. 8, 1965, now Pat. No. 3,435,325.

This invention relates to improvements in alternators and associated voltage regulation circuitry, particularly adapted for applications where both high power output and portability are desired and, additionally, to control apparatus associated with the prime mover of an alternator armature for increasing the throttle setting thereof during periods of load current demand.

Service trucks or the like utilized to transport repair crews and their equipment to a work site frequently require a heavy-duty generator to operate power tools and lighting equipment. Public utilities are particularly in need of a vehicle-mounted power source capable of supplying heavy load currents at work sites where power lines are being repaired, underground pipes are being serviced, or any of a number of other operations are being performed wherein electrically powered equipment is a necessity in order to rapidly and efficiently complete the job.

Passenger car owners also have a periodic need for an auxiliary power source capable of supplying electric current during emergencies, for example, to maintain lights and a home furnace in operation, as well as for use at remote locations away from home or business where power is unavailable. Heretofore, direct current generators or alternators of sufficient capacity to handle the power required for the operation of power tools or the supply of current to a home during a power failure, however, have been costly and bulky and thus have not enjoyed widespread use.

It is therefore, the primary object of this invention to provide an alternator having a novel regulating field and associated circuitry which enable the machine to deliver greater power under both normal and overload operating conditions than prior machines of the same physical size.

As a corollary to the foregoing object, it is an important aim of the invention to provide an alternator in which the aforesaid regulating field is energized in a manner to reduce the power loss therein and effectively compensate for the demagnetizing magnetomotive force of the armature reaction.

Another important object is to provide an alternator in which a regulating field winding is employed that is energized by the load current delivered by the alternator after rectification of such current in a manner such that the field produced by the regulating winding opposes the demagnetizing magnetomotive force produced in the armature.

In order to maintain the alternator armature at a speed sufficient to supply heavy load currents upon demand when such armature is driven by the engine of a motor vehicle which, when the vehicle is stationary, is normally at an idling speed, it is a further object of the instant invention to provide control circuitry responsive to load current demands for actuating the throttle of the vehicle engine to increase the throttle setting, thereby increasing the speed of the armature so that the alternator will be capable of handling the demand.

Figure 7:
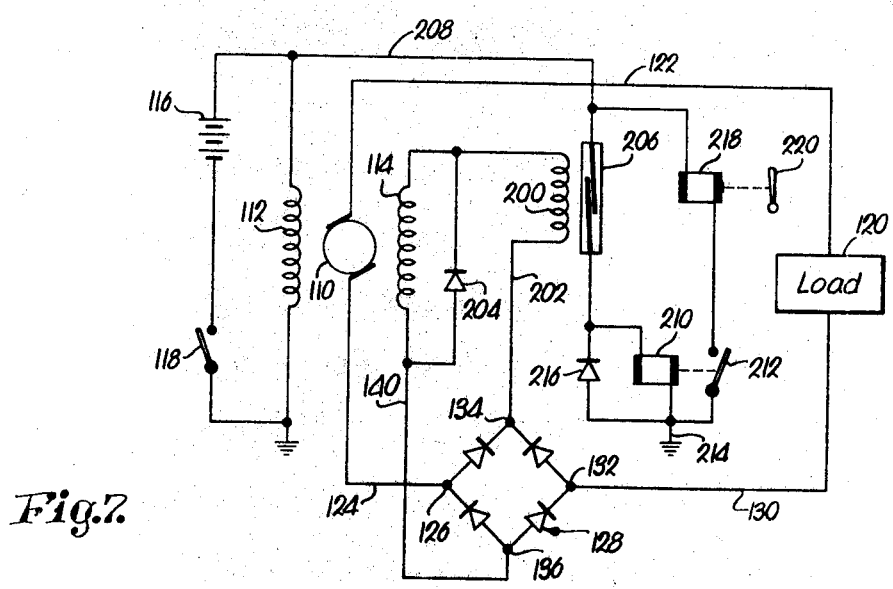

In the drawings:
FIGURE 1 is a schematic diagram showing one form of a separately excited alternator of the instant invention;
FIG. 2 is a schematic diagram of an alternative form of the separately excited alternator;
FIG. 3 is a schematic diagram showing another alternative form of the separately excited alternator;
FIG. 4 is a wave form graph illustrating the operation of the regulating field;
FIG. 5 is a schematic diagram showing a separately excited alternator having a dual voltage output;
FIG. 6 is a schematic diagram illustrating a self-excited alternator of the instant invention; and
FIG. 7 is a schematic diagram of the engine throttle control circut.

Referring to FIG. 1, an alternator is shown having a rotatable armature 10, a separately excited stator field winding 12, and a regulating field winding 14 which also forms a part of the stator of the machine. A source of DC potential 16 energizes winding 12 upon closure of a switch 18 illustrated in its open position.

Power is delivered from armature 10 through slip rings in the conventional manner, a load 20 being coupled with one side of the armature output by a conductor 22. The other side of the armature is connected to a conductor 24 coupled with an input terminal 26 of a diode bridge rectifier network 28. A conductor 30 interconnects the other input terminal 32 of network 28 and load 20. Output terminals 34 and 36 of network 28 are connected to the upper and lower ends, respectively, of coil winding 14 by leads 38 and 40.

In FIG. 2 it may be seen that the arrangement illustrated is the same as that shown in FIG. 1 and described hereinabove, except for the manner in which regulating winding 14 is coupled with the load current carrying conductors 24 and 30. In this alternative form, a transformer is utilized having a primary winding 42 connected in series with conductors 24 and 30, and a center tapped secondary winding 44. The left and right ends of secondary 44 are connected to the lower end of winding 14 by diodes 46 and 48 respectively. A lead 50 inter-connects the upper end of winding 14 with the center tap of secondary 44.

In the alternative form of FIG. 3, another arrangement is illustrated for interconnecting regulating winding 14 with conductors 24 and 30. A diode 52 interconnects conductors 24 and 30 in series relationship; a pair of leads 54 and 56 are connected to the lower and upper ends of winding 14, respectively, and connect with conductors 24 and 30 on opposite sides of diode 52 as illustrated.

FIGURE 5 shows a separately excited generator having a dual voltage output, the armature of the generator comprising a pair of series connected armature windings 58 and 60 connected to slip rings 62, 64 and 66.

A separately excited stator field winding 68 is energized by a DC source 70 upon closure of a switch 72 shown in its open position. A conductor 74 is coupled with slip ring 62 and feeds one side of two loads 76 and 78. A conductor 82 is coupled with slip ring 66 and feeds one side of a load 84 while completing the power circuit to load 78. A common line 80 is connected to slip ring 64 and completes the power circuits to loads 76 and 84. This arrangement may be utilized, for example, for 120/240 volt AC load circuits wherein loads 76 and 84 represent 120 volt circuits and loads 78 represents a 240 volt circuit.

A regulating field winding 86 in the stator of the machine is operably associated with armature winding 58 and is coupled with a transformer having a primary winding 88 interposed in series with conductor 74. The secondary 90 of the transformer feeds a diode bridge rectifier network 92 which, in turn, supplies full-wave rectified current to winding 86.

Similarly, a regulatnig winding 94 is operably associated with armature winding 60 and is energized by a transformer having a primary 96 interposed in series with conductor 82. The transformer secondary 98 feeds a diode bridge rectifier network 100 which delivers full-wave rectifier current to winding 94.

FIGURE 6 illustrates a self-excited alternator utilizing a regulating field 14 and rectifier network 28 of the same type as shown in FIG. 1 and described hereinabove. The difference between the structure of FIG. 6 and the separately excited alternators of FIGS. 1–3 is in the provision of a stator field winding 102 coupled in shunt relationship to load 20 and the output of armature 10. The input terminals of a diode bridge rectifier network 104 are connected to conductors 22 and 30, respectively, by a capacitor 104 and a lead 105. The output terminals of network 103 are connected to respective ends of winding 102 by leads 106 and 107, a variable resistor 108 being connected between leads 106 and 107 in shunt relationship to winding 102.

Good performance of both the separately excited and the self-excited alternators of the instant invention may be obtained with armature and stator constructions of simple design. In its simplest form, for example, the separately excited generator may employ an armature utilizing any one of a number of conventional armature windings and a 2-pole stator in which a pair of pole shoes are disposed in diametrically opposed relationship to one another. The housing of the stator will readily serve as the magnetic return path for the stator fields. In a 2-pole construction, the two field coils formed by the separately excited winding and the regulating winding may be disposed about respective pole shoes, it being understood, of course, that excitation is applied thereto such that the current flow through the coils produces fields which are additive. Similarly, the self-excited alternator, in its simplest form, may be constructed in the same manner except for the necessary change in the excitation connection to one of the field coils to provide self excitation. Furthermore, the construction may be reversed and the field coils and poles therefor carried by the rotor of the machine; the stator would then house the induced winding which delivers the alternating current output.

Referring to FIG. 7 a speed control system is illustrated in conjunction with an alternator of the separately excited type as previously described and shown in FIG. 1. Armature 110 is excited by a field winding 112 which is energized by a DC power source 116 upon closure of switch 118. Load 120 is coupled with the armature output by a conductor 122 and conductors 124 and 130, the latter two conductors being connected by a diode bridge rectifier network 128 at the input terminals 126 and 132 thereof. The lower end of regulating field winding 114 is connected to output terminal 136 of network 128 by a lead 140. The upper end of winding 114 is connected to output terminal 134 of network 128 via electromagnet 200 and lead 202. A diode 204 is connected in shunt relationship to winding 114.

Electromagnet 200 is disposed in close proximity to a normally open, dry-type reed switch 206 and, upon energization of the electromagnet, effects closure of switch 206. A lead 208 extends from DC source 116 to one contact of switch 206, the other contact being connected to the relay coil 210 of an electromechanical relay having a normally open relay switch 212. A ground connection 214 completes a power circuit through relay coil 210 when switch 206 is closed. A diode 216 is connected in parallel with coil 210 to reduce the tendency of the electromechanical relay to chatter in response to chattering of reed switch 206 which may occur when low values of current flow in electromagnet 200 (especially at the low frequency produced by the alternator when the armature prime mover is idling) since such current, as will be seen hereinafter, is not ripple free.

A solenoid 218 is connected between lead 208 and switch 212 and is energized upon closure of switch 212. Solenoid 218 is diagrammatically illustrated as being mechanically coupled with a throttle lever 20. The function of the circuitry of FIG. 7 is to increase the throttle setting in response to a demand for current from the generator armature; therefore, it will be appreciated that, in the utilization of the circuitry of FIG. 7 with motor vehicle engines, the armature of solenoid 218 would be coupled with the throttle linkage between the carburetor and the accelerator pedal in a manner to shift the linkage and increase engine speed upon energization of the solenoid.

Alternator operation

The magnetic action within the generator is illustrated in FIG. 4. The three graphs shown are interrelated in time as illustrated by the vertical broken lines intersecting the time axes of respective graphs. The ordinate values of wave form 222 are illustrated as negative magnetomotive force or ampere-turns, wave form 222 illustrating the demagnetizing armature reaction produced during alternator operation. The second graph shows a wave form 224 having positive values of magnetomotive force, and illustrates the field produced by the regulating winding of either the separately excited or the self-excited generator. Wave form 226 is ploted on a graph of current (amperes) vs. time and illustrates the alternating load current produced by the armature.

Referring to the separately excited alternator of FIGS. 1–3, an output is delivered by armature 10 upon closure of switch 18 and rotation of the armature by a prime mover (not shown). Under a current demand, load current flows through conductors 24 and 30 and, in so doing, is routed through regulating winding 14. The polarity of winding 14 and the direction of flow of conventional current is indicated in the figures by the positive sign notations and the arrows. In FIG. 1, when the alternating load current is traveling in a counterclockwise direction along the loop formed by armature 10, conductors 24 and 30, load 20, and conductor 22, such current traverses a path from input terminal 26 to output terminal 34 of network 28, then along lead 38 to winding 14 and along lead 40 to conductor 30 via terminals 36 and 32 and the diode therebetween. Current flow in a clockwise direction through the loop is conducted from terminal 32 to terminal 34 by the diode therebtween and, after passing through winding 14, is conducted from terminal 36 to terminal 26 by the associated diode. Thus, in either instance, unidirectional current flows through winding 14 from top to bottom as indicated by the arrow. Unlike the alternating current applied to load 20, the current energizing winding 14 is full-wave rectified.

This illustrated in FIG. 4 by wave form 224 which illustrates the magnetomotive force of the regulating field. Since this field is additive with respect to the separately excited field 12, the regulating field directly opposes the demagnetizing magnetomotive force of the armature illustrated by wave form 222. Since the regulating field is produced in response to rectification of the load current, maximum field intensity occurs cotemporaneously with maximum development of demagnetizing mangnetomotive force by the armature. This is illustrated in FIG. 4 by the peaks of respective wave forms 222 and 224 which occur periodically at the same instant in time.

Additionally, it should be noted that the zero crossing or minimum intensity of the regulating field also occurs cotemporaneously with minimum development of demagnetizing MMF by the armature. Therefore, magnetic excitation is not applied by the regulating field winding at times when the armature is not producing demagnetizing MMF. Thus, the compensating excitation of the regulating field is in phase with armature demagnetization and a lower power loss is realized in the regulating field for a given power output from the alternator since power is not dissipated by the regulating field except in proportion to armature demagnetization.

The arrangement of FIG. 2 also provides an energizing current for regulating winding 14 which is full-wave rectified. This is accomplished by the center tapped secondary 44 of the transformer in cooperation with diodes 46 and 48. Diode 46 delivers current to winding 14 when the left end of secondary 44 goes positive, and diode 48 delivers current to winding 14 when the right end of secondary winding 44 goes positive as a result of a change in the direction of flow of the alternating load current through primary 42.

In FIG. 3 only a half wave rectified current is applied to winding 14; therefore, this arrangement will not have the efficiency of the forms of the invention shown in FIGS. 1 and 2. Additionally, a small DC voltage, approximately equal to the voltage across the regulating winding, will appear across the load. This is usually undesirable when load 20 is a motor, but is acceptable for heaters, lamps, and other resistance-type elements as well as series type AC-DC motors.

The following is an example of the typical performance of a 2-pole, 2-kilowatt generator having a constant armature speed of 3600 r.p.m. (60 c.p.s. output):

| Loads in watts: | Output voltage |
| --- | --- |
| 0 | 120 |
| 500 | 122 |
| 1000 | 124 |
| 1500 | 125 |
| 2000 | 115 |

By opening switch 18, the 2-kilowatt generator may be operated as a self-excited generator for resistive loads above 1000 watts. In general, it is not required that the separately excited field be utilized when a generator made in accordance with the instant invention is operated in the upper range of its load capability. Typical performance for the 2- kilowatt generator under these conditions is:

| Load in watts: | Output voltage |
| --- | --- |
| 0 | 0 |
| 500 | 0 |
| 1000 | 80 |
| 1500 | 115 |
| 2000 | 115 |

The operation of the dual voltage alternator shown in FIG. 5 is the same as described hereinabove, except that the armature winding is split into two series-connected sections 58 and 60 and slip ring 64 is added to provide the dual voltage output. Transformers are utilized to interconnect the inputs of bridge networks 92 and 100 wih conductors 74 and 82 in order to isolate the regulating fields 86 and 94 from the alternating load current path. Since the two regulating fields are separately energized, the demagnetizing MMF in each armature winding section is compensated in accordance with the particular load current supplied by that section, regardless of unbalanced load current conditions among the three loads 76, 78 and 84. In this manner, over-compensation or under-compensation for the armature reactions for unbalanced loads is precluded.

The self-excited alternator of FIG. 6 also operates in the same manner as discussed above for the separately excited alternators insofar as the action of its regulating field 14 is concerned. However, the self-excited field 102 is energized by a full-wave rectified current delivered by bridge network 103 which is coupled in shunt relationship to the armature output. Thus, the MMF of shunt winding 102 pulsates in the same manner as the MMF of the regulating field, thereby increasing the efficiency of the alternator over the separately excited embodiments. It will be appreciated that, in the self-excited form of FIG. 6, there is no power loss in either field when the demagnetizing MMF of armature 10 is lower than its peak level, since both windings are energized only in proportion to the instantaneous amplitude of the load current.

Build-up of the self-excited alternator is assisted by capacitor 104 which tends to resonate with the inductance of the armature winding, thereby drawing additional current from the armature for application to the shunt field. The variable resistor 108 may be omitted if the capacitor and the field coil formed by winding 102 are properly matched.

With the shunt field establishing the voltage reference at no load, the regulating field serves to provide the additional excitation needed as the load increases. The following illustrates the typical performance of a 2-pole, 2-kilowatt generator having a constant armature speed of 3600 r.p.m.:

| Load in watts: | Output voltage |
| --- | --- |
| 0 | 120 |
| 500 | 122 |
| 1000 | 122 |
| 1500 | 122 |
| 2000 | 122 |
| 3000 | 120 |
| 3500 | 115 |

It may be noted that, in comparison with the separately excited alternator, the self-excited alternator will deliver rated voltage well into the overload region.

Part of this ability to deliver rated voltage in the overload region (for resistive loads) is due to the fact that the alternator tends to deliver more harmonics as the excitation is increased. The shunt field 102 uses these harmonics (since capacitor 104 presents a low impedance to the harmonic voltages) to provide additional excitation as higher load current are drawn. Thus, regulation is assisted both by the regulating field 14 and the effect of harmonic voltages in the shunt field 102.

Speed control system

The speed controlling circuit in FIG. 7 is illustrated in association with the separately excited generator of the instant invention, although the system may be utilized with the self-excited generator as well. With the vehicle engine at an idle and under a no-load condition, the various components of the system are in the condition as shown. When a load demand occurs, the increased current flowing through winding 114 energizes electromagnet 200 in series therewith, thereby effecting closure of reed switch 206. This, in turn, energizes relay coil 210 to effect closure of relay switch 212, thereby energizing solenoid 218 and actuating the throttle linkage illustrated by throttle lever 20. Diode 204 acts as a surge suppressor to prevent momentary energization of electromagnet 200 in the event that switch 118 is opened under no-load condition.

The utilization of the reed switch 206 greatly increases the response of the system since closure thereof may be effected, for example, by a current of 0.5 ampere flowing in electromagnet 200. Therefore, it is not required that a relatively high load current be demanded before the engine speed will be increased to provide the proper operating speed for armature 110. The electromagnet 200 is wound using a wire size sufficient to carry the full load current of the alternator continuously. Thus, it is operable over a much wider range of current values than conventional relays.

Although highly sensitive, reed switch 206 does not have a sufficiently high rating to withstand the currents demanded by solenoid 218, since such solenoid must have sufficient power to positively actuate a throttle linkage. Therefore, the electromechanical relay comprising relay coil 210 and switch 212 is required and is employed as a pilot relay to handle the heavier currents demanded by solenoid 218.

Having thus described the invention, what is claimed as new and desired to be secured by Letters Patent is:

1. Speed control apparatus comprising:
   an electric generator having an armature adapted to be driven by a prime mover controlled by a throttle;
   electrically responsive switching means operable in response to a relatively low level of excitation;
   means coupling said switching means with the output of said generator in a manner to energize the switching means in accordance with the magnitude of the load current delivered by said generator;
   an electrically operated actuator adapted for coupling with said throttle to shift the latter to a speed-increasing position; and
   relay means adapted for coupling with a source of electrical energy and capable of handling the current required for operation of said actuator,
   said relay means being coupled with said switching means and said actuator for energizing the latter in response to operation of the switching means, whereby to increase the speed of the prime mover in response to a load current demand.

2. The invention of claim 1,
   said switching means comprising an electromagnet responsive to said load current, and a magnetic reed switch disposed for operation by said electromagnet when the latter is excited at at least said level.

References Cited

UNITED STATES PATENTS

| | | | |
|---|---|---|---|
| 3,046,409 | 7/1962 | Patnaude | 290—40 |
| 3,070,705 | 12/1962 | Forss et al. | 290—40 |
| 3,192,394 | 6/1965 | Teter | 290—40 |

ORIS L. RADER, Primary Examiner

H. HUBERFELD, Assistant Examiner

U.S. Cl. X.R.

322—27, 38